UNITED STATES PATENT OFFICE.

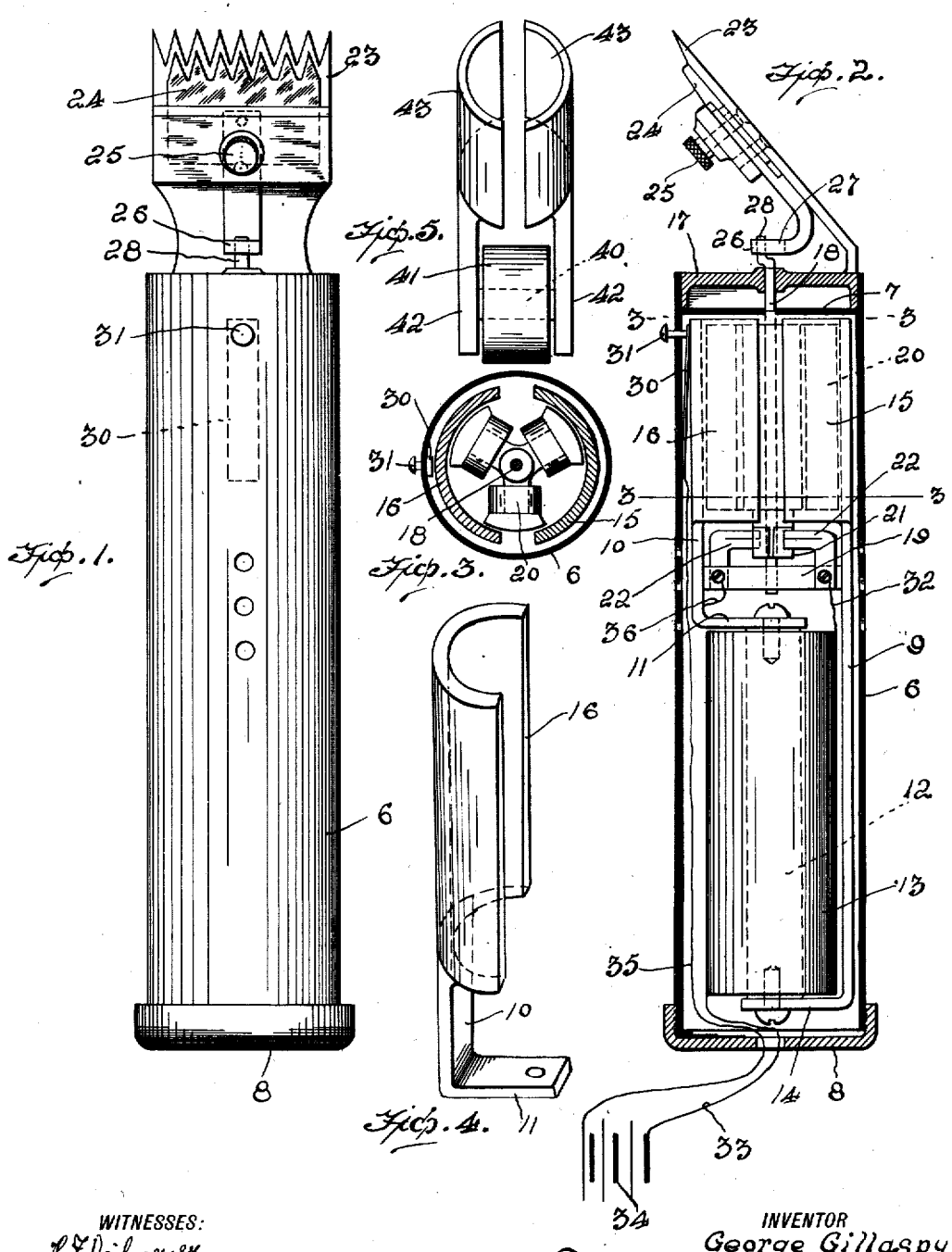

GEORGE GILLASPY, OF JOPLIN, MISSOURI.

ELECTRIC-MOTOR CONSTRUCTION.

1,267,210.   Specification of Letters Patent.   Patented May 21, 1918.

Application filed March 17, 1915. Serial No. 15,107.

*To all whom it may concern:*

Be it known that I, GEORGE GILLASPY, a citizen of the United States, residing at Joplin, in the county of Jasper and State of Missouri, have invented certain new and useful Improvements in Electric-Motor Construction; and I do hereby declare the following to be a full, clear, and exact description of the invention, such as will enable others skilled in the art to which it appertains to make and use the same.

This invention has for its object to provide a motor of novel construction adapted to be employed particularly for operating an electrically operated clipper of efficient and compact construction embodying a hollow casing constituting a handle and an electrically operated motor of improved construction snugly fitted within the handle.

With this and other objects in view, the invention consists in the novel construction, arrangement and formation of parts as will be hereinafter specifically described, claimed and illustrated in the accompanying drawing, in which:

Figure 1 represents a side elevation of the clipping machine.

Fig. 2 represents a longitudinal sectional view therethrough.

Fig. 3 represents a transverse sectional view on the line 3—3 of Fig. 2.

Fig. 4 represents a perspective view of one of the pole pieces removed, and

Fig. 5 represents a perspective view of a slightly modified type of pole piece.

Referring to the drawing in detail, wherein similar reference numerals designate corresponding parts throughout the several views, the numeral 6 indicates the hollow cylindrical casing of the machine which constitutes the handle and is formed of suitable insulating material. A partition 7 formed of insulating material is secured adjacent one end of the casing or handle 6 and the opposite open end of the latter is closed by a removable cap or cover 8. A pair of semi-cylindrical pole pieces 15 and 16 are suitably supported within the casing 6. The pole piece 16 is provided at its inner end with a longitudinally extending relatively short shank 10. The shank has an angular attaching arm 11 which is connected to the inner end of the core 12 of a field magnet coil 13. The pole piece 15 is provided at its inner end with a relatively long longitudinally extending shank 9 which is located between the casing 6 and the field magnet coil 13. This shank has an angular attaching arm 14 to which is secured the other or outer end of the core 12. The shanks 9 and 10 connect the field magnet coil 13 and pole pieces 15 and 16 in longitudinal alinement with their adjacent or inner ends in relatively spaced relation.

A bearing member 17 is secured in the end of the casing 6 exteriorly of the partition 7 and rotatably supports one end of a shaft 18, the opposite end of which is rotatably supported in a bearing member or bar 19 secured to the shanks 9 and 10 between the adjacent or inner ends of the field magnet coil 13 and the pole pieces 15 and 16. An armature 20 is secured upon the armature shaft 18 and is provided with the usual coils, the terminals of which are connected with the segments of a commutator or collector 21 on which are engaged the brushes 22 adjustably secured to the bearing member or brush holder 19. The relatively stationary toothed cutting blade 23 of the clipper is rigidly secured to the bearing member 17 and is disposed angularly with relation to the longitudinal axis of the casing 6. The toothed movable cutting blade 24 is pivotally secured to the relatively stationary blade 23 by a pin or screw 25. The inner extremity 26 of the blade 24 is reduced to provide a shank in which is formed a longitudinal slot 27 receiving the crank 28 upon the outer extremity of the armature shaft 18, whereby oscillatory movement is imparted to the movable blade 24 from the armature shaft 18.

A spring contact 30 is permanently secured at one end to the interior of the casing 6 and the free end thereof is normally disposed in spaced relation to the pole piece 16. A push button 31 is secured to the free end of the spring contact 30 and projects outwardly of the casing 6 whereby the contact may be moved inwardly to engage the pole piece 16 to complete the electrical circuit through the motor. One of the brushes 22 is connected to one terminal 32 of the field magnet coil 13, and the opposite terminal of the coil is connected with a battery 34, or other suitable source of electro-motive force by a conductor 33. The opposite side of the battery 34 is connected by a conductor 35 with the spring contact 30, which when thrust inwardly by the button 31 engages the pole piece 16 and completes the circuit to the other brush through the pole piece 16 and a conductor 36.

Referring to Fig. 5 wherein a modification of the field magnet and coil is illustrated, the numeral 40 indicates the core of the coil 41 to the ends of which are secured the pole pieces 42, having enlarged ends 43 of arcuate formation.

What I claim is:

A device of the class set forth, including a casing, a field magnet coil located in the casing, substantially semi-cylindrical pole pieces located in the casing in longitudinal alinement with said coil, a relatively short shank extending longitudinally from that end of one of the pole pieces adjacent said coil and provided with an angular attaching arm secured to the adjacent end of the core of said coil, a relatively long shank extending longitudinally from the corresponding end of the other pole piece and located between said casing and coil and having an angular attaching arm secured to the other end of said core, a bearing member secured to said shanks between the coil and pole pieces, a second bearing member carried by the casing, an armature having its shaft journaled in said bearing members, and brushes carried by said first bearing member and engaging the commutator of said armature.

In testimony whereof I affix my signature in presence of two witnesses.

GEORGE GILLASPY.

Witnesses:
ELLEN GILLASPY,
B. D. MOWRY.